Figure 1:
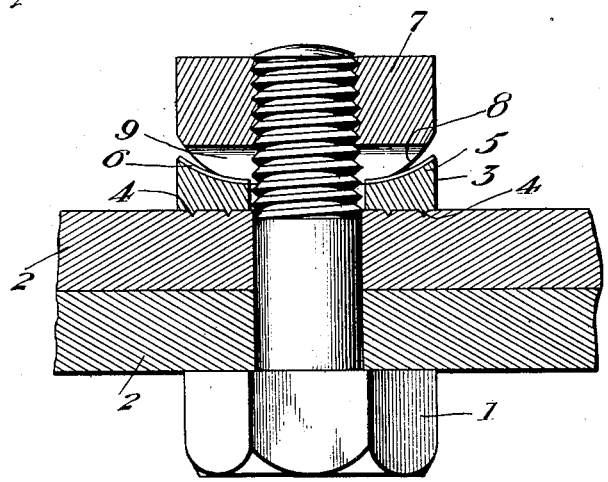

W. E. EMERY.
NUT LOCK.
APPLICATION FILED MAY 8, 1917.

1,257,202.

Patented Feb. 19, 1918.

WITNESS
R. E. Rousseau

INVENTOR
W. E. Emery,
BY Victor J. Evans,
ATTORNEY

UNITED STATES PATENT OFFICE.

WALTER E. EMERY, OF PEORIA, ILLINOIS.

NUT-LOCK.

1,257,202.　　　　Specification of Letters Patent.　　Patented Feb. 19, 1918.

Application filed May 8, 1917. Serial No. 167,373.

*To all whom it may concern:*

Be it known that I, WALTER E. EMERY, a citizen of the United States, residing at Peoria, in the county of Peoria and State of Illinois, have invented new and useful Improvements in Nut-Locks, of which the following is a specification.

The present invention relates to improvements in means for locking a nut upon a bolt, and has for its object to provide a locking device comprising a washer member having a concaved face provided with radially disposed ribs or projections and a nut member having a convex face which is slitted radially and which is adapted to be screwed upon a bolt and to be received in the concaved face of the washer, the contacting engagement between the nut and washer being such as to compress the portions of the nut between the slits thereof to bind the same against the threads of the bolt and also to permit of the ribs of the washer entering the slits of the nut to lock the nut upon the washer as well as upon the bolt.

It is a further object of the invention to produce a locking means for bolts including a washer having an inner straight face provided with prongs and an outer straight face provided with prongs and an outer straight face that is concaved and formed with slight radially disposed members in the nature of ribs, to also provide a nut having a convex face which is slitted radially, the contour of the said convex face being at a slightly different angle from the convex face of the washer and whereby the contacting engagement between the nut and washer will cause the portions of the nut between the slits thereof to be compressed against the threads of the bolt and also to permit of the slight ribs in the concaved face of the washer engaging between the said slits at the face of the bolt to retain the nut in locking engagement with the washer as well as with the bolt.

With the above and other objects in view the improvement resides in the construction, combination and arrangement of parts set forth in the following specification and falling within the scope of the appended claims.

Figure 2:
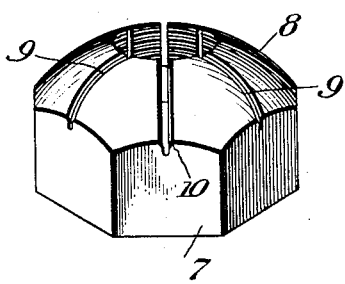
Figure 3:
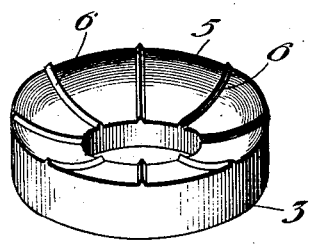

In the drawing:

Figure 1 is a sectional view through a superstructure connected by a bolt provided with my improved locking means, the said means being shown in section, Fig. 2 is a perspective view of the nut, and Fig. 3 is a similar view of the washer.

The bolt 1 is of the ordinary construction, and in Fig. 1 of the drawings is illustrated as passing through alining openings in two plates 2—2. Received upon the threaded shank of the bolt 1 is a washer member 3, the same having its inner face straightened but formed with outstanding prongs 4 which are designed to frictionally engage with or enter one of the plates 2. The outer face of the washer 3 is concaved, as at 5, and the said concaved face is formed with comparatively slight radially disposed ribs 6. These ribs are preferably V-shaped in cross section.

The nut is indicated by the numeral 7 and may be also of the ordinary construction, but the same has its inner face convexed, as at 8, the contour of the said face 8, however, being of a slightly different contour than that of the concaved face 5 of the washer 3. The concaved face 8 of the nut 7 is slitted radially, as at 9, and when the nut is screwed upon the bolt as illustrated in Fig. 1 of the drawings the portions of the convexed face 8 between the slits 9, by virtue of their contact with the concaved face 5 of the washer 3, will be forced toward each other to compress the same against the threads of the bolt 1, and when the nut has been screwed entirely home the slits 9 will receive the knife edges of the ribs 6. The outer edges of the walls provided by the slits 9 are preferably slightly beveled in opposite directions, as indicated by the numerals 10, so that the engagement of the ribs 6 in the said slits 9 will not tend to force the portions of the face of the nut 8 between the said slits away from each other or out of locking engagement with the threads of the bolt 1, but the nut in its locking position upon the bolt will be also effectively locked upon the washer 3, and the spurs 4 of the said washer by virtue of the contacting engagement of the nut with the washer may be forced to enter or to frictionally engage with one of the plates 2.

Having thus described the invention, what I claim is:

1. In combination with a bolt, of locking means therefor including a washer having an inner straight face provided with outwardly extending spurs, the outer face of the said washer being concaved and being provided with radially disposed slight substantially V-shaped ribs and the said washer adapted to be received upon the bolt, a nut designed to be screwed upon the bolt and having an inner convexed face of a slightly different angle or contour than the concaved face of the washer, the convex face of the nut having radial slits, the corners of the walls provided by the slits being beveled in opposite directions, said nut adapted to have its convex face received in the concaved face of the washer whereby to compress the portions of the nut between the slits thereof into frictional engagement with the threads of the bolt whereby to permit of the slight ribs of the washer being received in the widened outer portions of the slits of the nut to lock the washer to the nut.

2. In combination with a bolt, of locking means therefor including an inner member loosely arranged on the bolt and an outer member threaded on the bolt and designed to contact with the inner member, said inner member having its inner face provided with spurs, said members having their confronting faces provided with interengaging respective male and female surfaces, one of said surfaces being of a slightly different contour from the other confronting surface, one of said surfaces having radial slits, the corners of the walls provided by said slits being beveled in opposite directions, the other confronting surface having radially disposed slight substantially V-shaped ribs designed to be received in the widened outer portions of the slits to lock the members associated when the outer member has been screwed home on the bolt.

In testimony whereof I affix my signature.

WALTER E. EMERY.